E. WESTON.
Assignor to UNITED STATES ELECTRIC LIGHTING COMPANY.
BRACKET FOR INCANDESCENT LAMPS.
No. 10,299. Reissued Mar. 27, 1883.
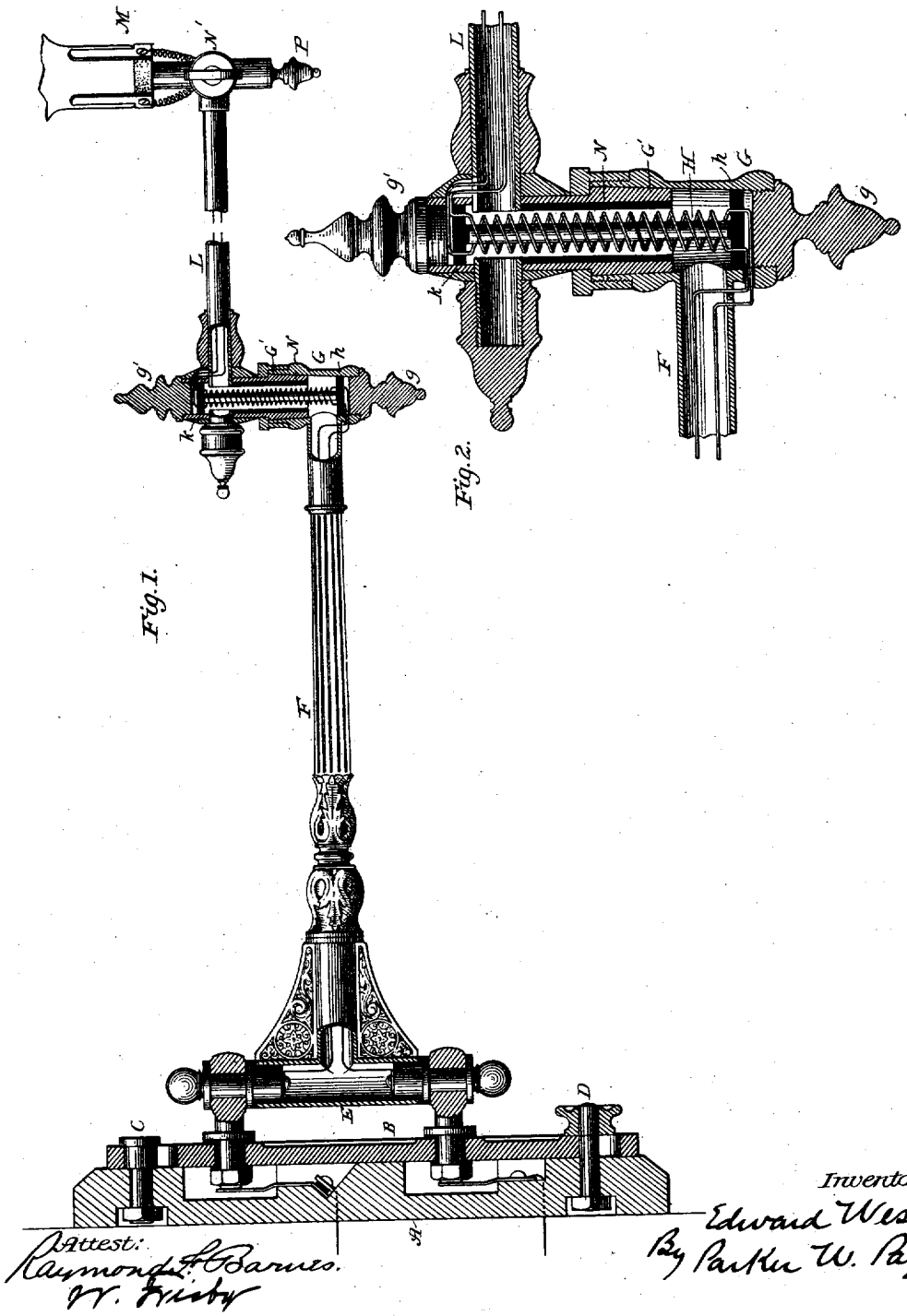
N. PETERS, Photo-Lithographer, Washington, D. C.

UNITED STATES PATENT OFFICE.

EDWARD WESTON, OF NEWARK, NEW JERSEY, ASSIGNOR TO UNITED STATES ELECTRIC LIGHTING COMPANY, OF NEW YORK, N. Y.

BRACKET FOR INCANDESCENT LAMPS.

SPECIFICATION forming part of Reissued Letters Patent No. 10,299, dated March 27, 1883.

Original No. 263,828, dated September 5, 1882. Application for reissue filed February 13, 1883.

*To all whom it may concern:*

Be it known that I, EDWARD WESTON, a subject of the Queen of Great Britain, and a resident of Newark, in the county of Essex and State of New Jersey, have invented certain new and useful Improvements in Brackets for Incandescent Lamps, of which the following is a specification.

My present invention is directed to the construction of electric-lamp brackets, the object being to produce a jointed bracket or support for one or more incandescent lamps similar in appearance to the ordinary forms of lamp or gas brackets now in use, and arranged to contain the conducting-wires that convey the current to and from the lamp or the circuit-controlling devices connected therewith.

The invention consists in the arrangement of conductors at the joint or joints in said bracket, which prevents breaking or abrasion of the same when the bracket is turned, and the short-circuiting or interruption of the circuit by which such accidents would be followed.

In the drawings hereto annexed, Figure 1 represents in elevation and part section a bracket constructed according to my invention; Fig. 2, an enlarged sectional view of the joint.

The bracket is shown as consisting of an arm, F, attached to a tube, E, pivoted by insulated heads to contact-posts set in a plate, B. This latter is slotted and secured by bolts C D to an insulated plate, A, recessed for the reception of terminal contact-springs and a safety-wire, as fully explained in another application of even date herewith. The hollow arm F ends in a cylindrical chamber, G, which is closed below by a screw-head, *g*. This chamber forms a socket, within which fits the second joint of the bracket, and, though the construction of the latter may be greatly varied, the form shown in the drawings is believed to be the most convenient and reliable, and to it reference is accordingly made for an understanding of the invention.

G′ is a cylinder, the lower end fitting in chamber G and the top closed by a screw-head, *g*′. To cylinder G′ the second arm, L, of the bracket is fixed in any desired manner.

N is a tube, of insulating material, fitting the interior of cylinder G′. Two plates of insulating substance, *k h*, are secured near the opposite ends of the cylinder, and a wooden pin, H, held between them. The conductors are brought from the first joint or tube under the plate *h*, and are carried up through perforations therein. They are then formed in spirals about the pin H and carried through the upper plate, *k*. From this they are led into the second section, L, and connected to the terminals of a switch, N′, by means of which the circuit is completed through the lamp M. By this arrangement the wires are not affected by the movement of the sections of brackets, except in the spirals. As these permit of considerable movement without bringing the wires into contact with each other or subjecting them to any strain, no accidents from breaking or wearing off of the insulating material are likely to occur. As a further precaution, the walls of the chamber G′ are insulated, so that if the convolutions of the spirals are forced into contact with them no injury can result. Arm L, whether by a special construction or by means of suitable stops, should not be capable of a complete revolution in the socket G. A movement of three hundred and fifty degrees may be safely permitted without liability of twisting too much the conductors. In the present case a knob or head, P, on the section L serves this purpose. This knob encounters the section F when the arm or section L is turned, preventing a complete revolution of said section or arm.

It may be stated that the number of joints or sections of bracket is not material, though two will for most purposes be amply sufficient.

While I do not claim broadly herein a jointed bracket for incandescent lamps, I do not wish to be understood as confining myself to the precise arrangement described. The object in view, as appears from the description, is to keep the conductors as far as practicable inclosed in the bracket to prevent them from kinking and abrasion and to secure a perfect electrical connection between the wires in one section of the bracket and those in others.

Instead of the conductors proper being carried through the plates *h k* and bent into the spirals, these latter may be formed independently, and of some metal more resilient than copper, and the conductors joined to them.

Having thus described my invention, what I claim is—

1. The combination, with a jointed bracket or support for incandescent lamps, of conductors contained within the bracket and formed in spirals at the joints, substantially as and for the purpose set forth.

2. The combination, in a bracket for incandescent lamps, of a section, as F, a section, as L, and a joining-section, G, with conducting-wires passing through the several sections and formed in spirals in the joining-section, substantially in the manner described.

3. The combination, in a bracket for incandescent lamps, of a section, as F, a section, as L, a joining-section, as G, and insulating-plates *k h*, with conducting-wires passing through said sections and the plates *k h*, and formed in spirals in the section G, substantially as shown.

4. The combination of section F, section L, and insulated joining section or socket G, with conductors passing through the said sections and formed in spirals in the insulated joining section, as shown.

5. The combination, in a bracket for incandescent lamps, of a section, as F, a section, as L, a joining-section, G, insulating-plates *h k*, and pin H, with conductors passing through said sections and plates and formed in spirals around the pin H, substantially as and for the purpose set forth.

6. The combination, with the jointed sections of an electrical fixture, of a continuous conductor or conductors contained within the fixture, such conductor or conductors being flexible at the joints, so as to permit free movement of the sections of the fixture with reference to each other and maintain electrical connection between the parts of the conductor in the several sections, and a stop for limiting the movement of one section or another, as set forth.

7. The combination, with the jointed sections of an electrical fixture, of insulated chambers at the joints, conductors contained within the fixture and having flexible connecting portions in the insulated chambers, and a stop for limiting the movement of one section or another, as set forth.

EDWARD WESTON.

Witnesses:
HENRY A. BECKMEYER,
JOHN C. YOUNG.